United States Patent
Kang et al.

(10) Patent No.: US 11,900,386 B2
(45) Date of Patent: *Feb. 13, 2024

(54) METHODS AND APPARATUS FOR PAYMENT TRANSFER FRAUD DETECTION

(71) Applicant: Walmart Apollo, LLC, Bentonville, AR (US)

(72) Inventors: Linhong Kang, Sunnyvale, CA (US); Arthi Vijayakumar, San Jose, CA (US); YiYi Zeng, San Jose, CA (US); Zhiping Tang, Cupertino, CA (US); Uday Akella, San Carlos, CA (US); Mayra Rocio Harmon, Cave Springs, AR (US); Charlie Berry, Fayetteville, AR (US); Nathan Olds, Rogers, AR (US); John Fields, Rogers, AR (US); Kristin Danielle Piper, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,561

(22) Filed: Mar. 2, 2023

(65) Prior Publication Data
US 2023/0206243 A1    Jun. 29, 2023

Related U.S. Application Data

(63) Continuation of application No. 16/577,236, filed on Sep. 20, 2019, now Pat. No. 11,631,082.

(51) Int. Cl.
*G06Q 20/40* (2012.01)
*G06N 20/00* (2019.01)

(52) U.S. Cl.
CPC ......... *G06Q 20/4016* (2013.01); *G06N 20/00* (2019.01)

(58) Field of Classification Search
CPC .................................................. G06Q 20/4016
See application file for complete search history.

(56) References Cited

U.S. PATENT DOCUMENTS 10,572,653 B1 *  7/2020  Semichev .............. G06N 5/003
10,825,028 B1   11/2020  Kramme et al.
(Continued)

OTHER PUBLICATIONS

Douglas King of the Federal Reserve Bank of Atlanta, in "The Future of U.S. Fraud in a Post-EMV Environment" (Year: 2019).*

(Continued)

*Primary Examiner* — Olabode Akintola
*Assistant Examiner* — Brandon M Duck
(74) *Attorney, Agent, or Firm* — Morgan, Lewis & Bockius LLP; Manita Rawat

(57) ABSTRACT

This application relates to apparatus and methods for identifying fraudulent payment transfers. In some examples, a computing device determines payment transfer initiation features, and payment transfer reception features, based on previous payment transfer data. The computing device may train a machine learning fraud detection model with the payment transfer initiation features, and may train a machine learning fraud detection model with the payment transfer reception features. Once trained, the computing device may employ the machine learning fraud detection models to identify fraudulent payment transfers. For example, the computing device may determine whether a payment transfer is fraudulent when the payment transfer is initiated. Assuming the payment transfer is allowed, the computing device may determine whether the payment transfer is fraudulent when the payment is being received. In some (Continued)

examples, the computing device prevents completion of the purchase transaction if the payment transfer is determined to be fraudulent.

20 Claims, 8 Drawing Sheets

(56) References Cited

U.S. PATENT DOCUMENTS

| | | |
|---|---|---|
| 2009/0192855 A1* | 7/2009 | Subramanian ..... G06Q 30/0202 |
| 2016/0328700 A1 | 11/2016 | Bortolotto et al. |
| 2017/0070484 A1 | 3/2017 | Kruse et al. |
| 2017/0085587 A1 | 3/2017 | Turgeman |
| 2017/0111506 A1 | 4/2017 | Strong et al. |
| 2017/0359359 A1 | 12/2017 | Jaladi et al. |
| 2019/0318358 A1* | 11/2019 | Chamberlin ....... G06Q 20/4016 |
| 2020/0005310 A1* | 1/2020 | Kumar ............... G06Q 20/4016 |
| 2020/0334687 A1 | 10/2020 | Ren et al. |
| 2021/0256393 A1* | 8/2021 | Amjadian .......... G06N 20/0888 |
| 2021/0279731 A1 | 9/2021 | Agrawal et al. |

OTHER PUBLICATIONS

Douglas King, "The Future of U.S. Fraud in a Post-EMV Environment," Retail Payments Risk Forum Working Paper, Federal Reserve Bank of Atlanta, Jun. 2019, 25 pages.

\* cited by examiner

METHODS AND APPARATUS FOR PAYMENT TRANSFER FRAUD DETECTION

CROSS-REFERENCE TO RELATED APPLICATION

This application is a continuation of U.S. patent application Ser. No. 16/577,236, filed Sep. 20, 2019, and entitled "METHODS AND APPARATUS FOR PAYMENT TRANSFER FRAUD DETECTION," which is incorporated herein in its entirety by reference.

TECHNICAL FIELD

The disclosure relates generally to fraud detection and, more specifically, to identifying fraudulent payment transactions.

BACKGROUND

At least some known systems allow for the transfer of payments from one person to another. For example, some companies (e.g., retailers or banks) allow an individual to make a payment to the company, and the company will transfer at least a portion of the payment to another person (e.g., a consumer to consumer money transfer). The payer typically identifies the person receiving the payment. In some examples, the payment being received is in the form of cash. As such, the person receiving the payment may have to present themselves at a receiving location, such as at a location of the company facilitating the transfer, to receive the payment. In some examples, the person receiving the payment may have to present an identification (ID), such as a driver's license, to verify their identity and receive the payment.

In many cases, however, the payment transfer is fraudulent (e.g., a scam). For example, the person sending the payment (i.e., payer) may have stolen money from another, and is using the transfer to satisfy their own debt. The payer may have, without permission, withdrawn cash from another's bank account, and is now making a payment to another with the case. In some cases, the person receiving payment (i.e., payee) may have fraudulently initiated or requested the transfer. For example, the payee may have fraudulently obtained a credit card and ID of another. The payee may then initiate a payment to themselves by identifying themselves as the lawful owner of the credit card and ID when initiating a payment transfer. In some examples, the payee may fraudulently convince others to make payments to the payee (e.g., such as with false marketing initiatives or promises), thereby causing financial loss to the payers.

In each of these examples, the payment transaction is fraudulent. Fraudulent payment transfers may cause financial harm to individuals as well as the company facilitating the payment transfer. For example, an individual may be unable to recover money fraudulently transferred. In some examples, the company may reimburse the individual for the fraudulent payment transfer, leaving the company with a financial loss. In addition, companies may incur legal fees and reputational harm in connection with fraudulent payment transfers. Thus, there are opportunities to address fraudulent payment transactions to benefit retailers and individuals.

SUMMARY

The embodiments described herein are directed to automatically identifying fraudulent payment transfers. A payment transfer may include a payment, such as a cash or electronic payment, from one person (e.g., a sender) to another person (e.g., a beneficiary), for example. The embodiments may identify a fraudulent payment transfer as it is taking place, for example, allowing a retailer to stop or not allow the payment transfer. In some examples, the embodiments may allow for the identification of a fraudulent payment transfer when the payment transfer is being initiated by the sender of the payment (e.g., payer). In some examples, the embodiments may allow for the identification of a fraudulent payment transfer when the payment is being received by the beneficiary of the payment (e.g., payee). The embodiments may disallow the payment transfer or, in some examples, may cause the payment transfer to be presented for closer review to determine if fraud is indeed involved. As a result, the embodiments may allow a company to decrease expenses and costs related to fraudulent payment transfers. In some examples, the embodiments may reduce the amount of financial losses incurred by individuals affected by fraudulent payment transfers. In addition, the embodiments may decrease reputational losses for companies facilitating the payment transfers. Those of ordinary skill in the art having the benefit of these disclosures may recognize additional advantages and benefits as well.

In accordance with various embodiments, exemplary systems may be implemented in any suitable hardware or hardware and software, such as in any suitable computing device. For example, in some embodiments, a computing device is configured to receive a request for a payment transfer from a payer to a payee. The computing device may also be configured to determine, based on the received request, first data associated with previous payment transfers for at least one of the payer and the payee. The computing device may be further configured to generate second data identifying a fraud detection value based on the received request and the first data. The computing device may be configured to determine whether the payment transfer is fraudulent based on the second data. Based on the determination, the computing device may be configured to transmit a response identifying whether the payment transfer is fraudulent.

In some embodiments, a method is provided that includes receiving a request for a payment transfer from a payer to a payee. The method may also include determining, based on the received request, first data associated with previous payment transfers for at least one of the payer and the payee. The method may further include generating second data identifying a fraud detection value based on the received request and the first data. Further, the method may include determining whether the payment transfer is fraudulent based on the second data. Based on the determination, the method may include transmitting a response identifying whether the payment transfer is fraudulent.

In yet other embodiments, a non-transitory computer readable medium has instructions stored thereon, where the instructions, when executed by at least one processor, cause a computing device to perform operations that include receiving a request for a payment transfer from a payer to a payee. The operations may also include determining, based on the received request, first data associated with previous payment transfers for at least one of the payer and the payee. The operations may further include generating second data identifying a fraud detection value based on the received request and the first data. Further, the operations may include determining whether the payment transfer is fraudulent based on the second data. Based on the determination, the operations may include transmitting a response identifying whether the payment transfer is fraudulent.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
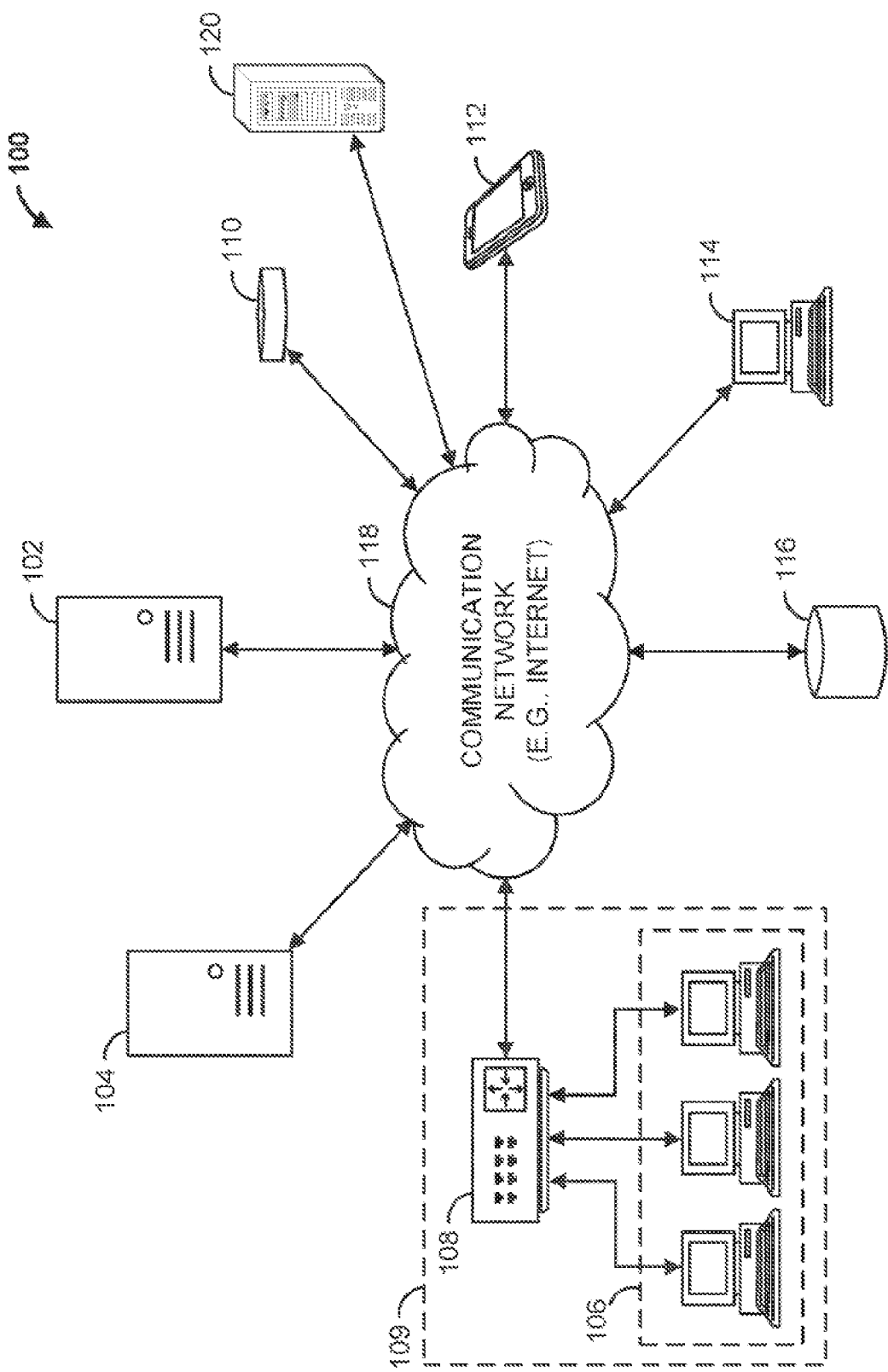
FIG. 1 is a block diagram of a fraud detection system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a fraud detection system 100 that includes a fraud detection computing device 102 (e.g., a server, such as an application server), a web server 104, workstation(s) 106, database 116, and multiple customer computing devices 110, 112, 114 operatively coupled over network 118. Fraud detection computing device 102, workstation(s) 106, web server 104, and multiple customer computing devices 110, 112, 114 can each be any suitable computing device that includes any hardware or hardware and software combination for processing and handling information. In addition, each can transmit data to, and receive data from, communication network 118.

For example, fraud detection computing device 102 can be a computer, a workstation, a laptop, a server such as a cloud-based server, or any other suitable device. Each of multiple customer computing devices 110, 112, 114 can be a mobile device such as a cellular phone, a laptop, a computer, a tablet, a personal assistant device, a voice assistant device, a digital assistant, or any other suitable device.

Additionally, each of fraud detection computing device 102, web server 104, workstations 106, and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 110, 112, 114, fraud detection system 100 can include any number of customer computing devices 110, 112, 114. Similarly, fraud detection system 100 can include any number of workstation(s) 106, fraud detection computing devices 102, web servers 104, and databases 116.

Workstation(s) 106 are operably coupled to communication network 118 via router (or switch) 108. Workstation(s) 106 and/or router 108 may be located at a store 109, for example. Store 109 may be operated by a retailer that allows for payment transfers, for example. Workstation(s) 106 can communicate with fraud detection computing device 102 over communication network 118. The workstation(s) 106 may send data to, and receive data from, fraud detection computing device 102. For example, the workstation(s) 106 may transmit data related to a transaction, such as a payment transfer, to fraud detection computing device 102. In response, fraud detection computing device 102 may transmit an indication of whether the payment transfer is to be allowed. Workstation(s) 106 may also communicate with web server 104. For example, web server 104 may host one or more web pages, such as a retailer's website. Workstation(s) 106 may be operable to access and program (e.g., configure) the webpages hosted by web server 104.

Fraud detection computing device 102 is operable to communicate with database 116 over communication network 118. For example, fraud detection computing device 102 can store data to, and read data from, database 116. Database 116 can be a remote storage device, such as a cloud-based server, a memory device on another application server, a networked computer, or any other suitable remote storage. Although shown remote to fraud detection computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and Nth customer computing device 114 may communicate with web server 104 over communication network 118. For example, web server 104 may host one or more webpages of a website. Each of multiple computing devices 110, 112, 114 may be operable to view, access, and interact with the webpages hosted by web server 104. In some examples, web server 104 hosts a web page for a retailer that allows for the initiation of payment transfers. For example, an operator of one of multiple computing devices 110, 112, 114 may access the web page hosted by web server 104, provide identification information (e.g., driver's license information) and bank account information, and initiate a payment transfer to another person. In some examples, web server 104 may transmit data that identifies the attempted payment transfer to fraud detection computing device 102. In response, fraud detection computing device 102 may transmit an indication of whether the payment transfer is to be allowed.

As illustrated in FIG. 1, fraud detection system 100 may also include payment transfer facilitator server 120. Payment transfer facilitator server 120 may be operated by another company, such as a bank, that facilitates the payment transfer. For example, assuming a person initiates a payment transfer at store 109, workstation 106 may transfer payment transfer information to payment transfer facilitator server 120 to electronically have funds transferred to an account of the payment facilitator. The payment transfer information may also identify a person that is to receive the payment. Similarly, payment transfer facilitator server 120 may facilitate payment transfers initiated online, such as a webpage hosted by web server 104. In some examples, the payment facilitator charges a fee for facilitating the payment transfer, which may be a fixed cost or a percentage of the amount being transferred.

Fraud detection system 100 may identify fraudulent payment transfers. Payment transfers may include, for example, cash payments, which may need to be picked up by a payee at a location, such as store 109. Payment transfers may also include electronic payments (e.g., an electronic transfer, Automated Clearing House (ACH) transfer, wire transfer, payment to a credit card or gift card, etc.).

Fraud detection system 100 may identify an attempted in-store initiation of a payment transfer as fraudulent. Fraud detection system 100 may also identify attempted online initiations of payment transfers as fraudulent. In some examples, fraud detection system 100 may identify a payment transfer as fraudulent as or when the payment is being received by a payee. In some examples, fraud detection system 100 may prohibit the completion of a payment transfer determined to be fraudulent.

To identify fraudulent transactions, fraud detection system 100 may generate and employ one or more fraud detection models to determine whether a payment transfer is fraudulent. In some examples, the fraud detection models are implemented in a combination of hardware and software. For example, one or more processors may carry out one or more functions of the fraud detection models by executing instructions. Fraud detection system 100 may train the one or more fraud detection models with specific features including, for example, original event features, derived event features, velocity features, and/or network features, described in further detail below. Once the fraud detection models are trained, fraud detection computing device 102 may employ the fraud detection models in real-time to determine whether payment transfers are fraudulent.

For example, fraud detection system 100 may receive payment transfer data identifying the initiation of an in-store or online (e.g., real-time) payment transfer, and determine if the payment transfer is fraudulent based on the one or more models. In some examples, fraud detection system 100 may receive payment transfer data identifying the receiving (e.g., pickup) of a payment transfer by a payee. In either case (e.g., at payment initiation or payment pickup), fraud detection system 100 may determine if the payment transfer is fraudulent. If fraud detection system 100 identifies the payment transfer as fraudulent, fraud detection system 100 may deny the payment transfer. Otherwise, if fraud detection system 100 does not identify the payment transfer as fraudulent, fraud detection system 100 may allow the payment transfer.

In some examples, fraud detection system 100 may "challenge" a payment transfer. In these examples, if fraud detection system 100 determines that the payment transfer is to be challenged, fraud detection system 100 may require additional data to confirm that the payment transfer is not fraudulent. For example, fraud detection system 100 may identify to an associate of a retailer to check an additional ID, to call a payee or payer for verification, or to ask additional questions to the payee or payer, for example.

Data Aggregation and Segmentation

To generate the fraud detection models, fraud detection system 100 may aggregate historical payment transfer data, such as data identifying previous payment transfers (e.g., including payment transfers marked as fraudulent) and/or associated customer data. In some examples, fraud detection system 100 generates segments based on the historical payment transfer data. As an example, fraud detection system 100 may segment the historical payment transfer data based on where a payment transfer was initiated (e.g., at a location of a retailer, at a location of a bank, online, etc.), and where the payment transfer is to be received (e.g., at a same or different location of a retailer, at a same or different location of the bank, a different retailer, a different bank, etc.). In one example, fraud detection system 100 aggregates the historical payment transfer data into the following six segments: payment transfer initiations with payments that are sent and received with a same retailer; payment transfer receptions that are sent and received with a same retailer; payment transfer initiations with payments that are sent and received with a same third-party payment facilitator; payment transfer receptions that are sent and received with a same third-party payment facilitator; payment transfer initiations with payments that are sent from a retailer and received at a third party payment facilitator; and payment transfer receptions that were sent from a third party facilitator but received at a retailer.

Feature Generation

Based on the aggregated historical payment transfer data, fraud detection system 100 generates fraud detection features for at least one of payment initiation (e.g., for the sending of a payment) and payment reception (e.g., for the receiving of a payment). For example, fraud detection system 100 may determine and generate original event features, derived event features, velocity features, and/or network features based on the aggregated historical payment transfer data.

Original event features may include, for example, transaction amounts (e.g., the amount of a payment transfer), the type of ID a payer or payee used to identify themselves, an address of the payer or payee, the type of payment (e.g., credit card, bank account, cash, check, debit card, etc.).

Derived event features may include, for example, the age of a payer or payee, or a family relationship between the payer and payee. Derived event features may also include an amount of time that passed between when the payment was initiated, and when the payment was picked up or received (e.g., a day, a week, a month). Derived event features may also include the distance between where the payment was initiated, and where the payment was received, as well as the distance between an address for the payer and an address for the payee. In some examples, derived event features may also include the distance between an address for the payer and a payment pickup location, and the distance between an address for the payee and the payment pickup location.

Velocity features may include, for example, a number of payment transactions involving a payer or payee over a period of time (e.g., over the last twenty four hours, three days, month, year, etc.). For example, a number of transactions with a same payee may be determined. In addition, a number of transactions with the payee as the payer may be determined. Similarly, a number of transactions with a same payer may be determined, as well as a number of transactions with the payer as the payee. In some examples, the velocity features include a number of transactions that include the same payer and payee over a period of time. For example, the velocity features may include a number of transactions with the same payer and payee as payer and payee, respectively, or a number of transactions with the payer and payee regardless of whether they were payer and payee, respectively (e.g., payee may have acted as payer, and payer may have acted as payee). The payer or payee may be identified by, for example, a name, an address, a phone number, an ID (e.g., a driver's license), or any other suitable identifier.

Network features may include, for example, a period of time (e.g., a week, a month, three months, a year, etc.) over which the same payer ID, payer name, payer address, payer zip code, payer ID, or any other payer information has be used (e.g., presented) for a payment transfer. Similarly, network features may include a period of time over which the same payee ID, payee name, payee address, payee zip code, payee ID, or any other payee information has be used for a payment transfer. In some examples, network features include the combined age of the payer and payee. In some examples, network features include a number of linkages determined for a payer or payee over a period of time. A linkage may be a number of phone numbers, for example, linked to a same payer or payee and used in a previous transaction. A linkage may also include a number of varying IDs, a number of varying payment forms (e.g., credit cards, bank accounts, etc.), or a number of addresses linked to a same payer or payee. The linkages may be determined by fraud detection computing device 102, and may be determined based on the payer or payee acting as payer or payee, respectively, or regardless of whether payer and payee acted as payer and payee.

Fraud Detection Model Training and Generation

Fraud detection system 100 may train one or more fraud detection models with the generated features. For example, fraud detection system may train a fraud detection model with one or more original event features, one or more derived event features, one or more velocity features, and/or one or more network features. In some examples, fraud detection system 100 trains a fraud detection model with each of original event features, derived event features, velocity features, and network features. The training of the fraud detection models may be supervised, where each generated feature is associated (e.g., labelled, tagged) with a payment transaction that was, or was not, fraudulent.

Each fraud detection model may be based on, for example, one or more decision trees. In some examples, each fraud detection model may be based on one or more supervised machine learning algorithms such as Logic Regression, Support Vector Machines, Random Forest, Gradient Boosting Machines (e.g., xGBoost), or any other suitable models. In some examples, one or more fraud detection models are trained to detect for fraud during payment initiation, and one or more fraud detection models are trained to detect for during payment reception. For example, generated features may be identified (e.g., by a user) as "payment related," or as "payment reception" related (or both). Fraud detection models trained to detect for fraud during payment initiation may be trained with "payment initiation" related features, while fraud detection models trained to detect for fraud during payment reception may be trained with "payment reception" related features.

Fraud Detection Model Implementation

Once the fraud detection models are trained, fraud detection system 100 may employ the fraud detection models to determine whether payment transfers are fraudulent. For example, as a customer is attempting to initiate a payment transfer at store 109, workstation 106 may transmit store money send request data identifying the payment transfer to fraud detection computing device 102. Fraud detection computing device 102 may determine whether the payment transfer is to be allowed (and thus not fraudulent) based on applying one or more of the fraud detection models to the particular payment transfer.

For example, fraud detection computing device 102 may execute one or more of the fraud detection models operating on data identifying and characterizing the payment transfer to generate a fraud detection score. Fraud detection computing device 102 may compare the generated fraud detection score to a threshold (which may be configured by a user, or may be determined during the training phase of the fraud detection models) to determine whether the payment transfer is fraudulent. For example, if the generated fraud detection score is at or beyond the threshold, fraud detection computing device 102 may determine that the payment transfer is fraudulent. Otherwise, if the generated fraud detection score is below the threshold, fraud detection computing device 102 may determine that the payment transfer is not fraudulent. In some examples, the threshold varies based on one or more of the time of year (e.g., near holidays), the amount of the payment transfer, the location of where the payment is initiated or where the payment is to be received, or historical payment transfer data for the payer or the payee.

Fraud detection computing device 102 may transmit store money send response data to store 109 identifying whether the payment transfer is allowed. In some examples, one or more of fraud detection computing device 102 and workstation 106 prevent the payment transfer from occurring (e.g., deny the payment transfer) if the payment transfer is identified as fraudulent.

In some examples, fraud detection computing device 102 determines that additional information is required, and "challenges" the payment transfer. For example, fraud detection computing device 102 may determine that the payer is to show an additional ID, or verify information, before the payment transfer is allowed. Fraud detection computing device 102 may transmit money send response data identifying the challenge to store 109.

Similarly, as a customer is attempting to initiate, via a customer computing device 110, 112, 114, a payment transfer on a website hosted by web server 104, web server 104 may transmit online money send request data identifying the payment transfer to fraud detection computing device 102. Fraud detection computing device 102 may determine whether the payment transfer is to be allowed based on applying one or more of the fraud detection models to the particular online transaction. Fraud detection computing device 102 may then transmit online money send response data to web server 104 identifying whether the payment transfer is allowed. In some examples, one or more of fraud detection computing device 102 and web server 104 prevent the payment transfer from occurring (e.g., deny the payment transfer) if the transaction is identified as fraudulent.

In some examples, fraud detection computing device 102 determines that additional information is required, and "challenges" the payment transfer. For example, fraud detection computing device 102 may determine that the payer is to show an additional ID, or verify information, before the payment transfer is allowed. Fraud detection computing device 102 may transmit money send response data identifying the challenge to web server 104.

Assuming the initiation of a payment transfer is not denied by fraud detection computing device 102, the payment transfer may be initiated. For example, fraud detection computing device 102 may transmit store money send response data to store 109 or online money send response data to web server 104 (depending on the received request) identifying that the payment transfer may be initiated. When a payee, however, attempts to receive the payment, fraud detection computing device 102 may again determine whether the payment transfer is to be allowed. F or example, the payment transfer may identify the payee, and how the payee may receive the payment. In some examples, the payee may need to be present at a location, such as at store 109, to receive the payment. In some examples, the payee may receive the payment electronically after confirming the payment transfer, such as on a webpage hosted by web server 104. Assuming the payee is to receive the payment at store 109 (e.g., payee is to pickup cash at store 109), workstation 106 may transmit money receive request data to fraud detection computing device 102 identifying the payment transaction and the payment the payee is to receive. Fraud detection computing device 102 may determine whether the payment is to be allowed based on applying one or more fraud detection models to the payment transaction, and may transmit money receive response data to store 109 identifying whether the payment transfer is to be allowed.

In some examples, fraud detection computing device 102 determines that additional information is required, and "challenges" the payment transfer. For example, fraud detection computing device 102 may determine that the payee is to show an additional ID, or verify information, before the payment transfer is allowed. Fraud detection computing device 102 may transmit money receive response data identifying the challenge to store 109.

Similarly, if the payee is to accept the payment online (e.g., by confirming the payment on a webpage hosted by web server 104), web server 104 may first verify whether the payment transfer should be allowed by transmitting money receive request data to fraud detection computing device 102. Fraud detection computing device 102 may apply one or more fraud detection models to the payment transaction, and may transmit money receive response data to web server 104 identifying whether the payment transfer is to be allowed.

In some examples, fraud detection computing device 102 determines that additional information is required, and "challenges" the payment transfer. For example, fraud detection computing device 102 may determine that the payee is to show an additional ID, or verify information, before the payment transfer is allowed. Fraud detection computing device 102 may transmit money receive response data identifying the challenge to web server 104.

Figure 2:
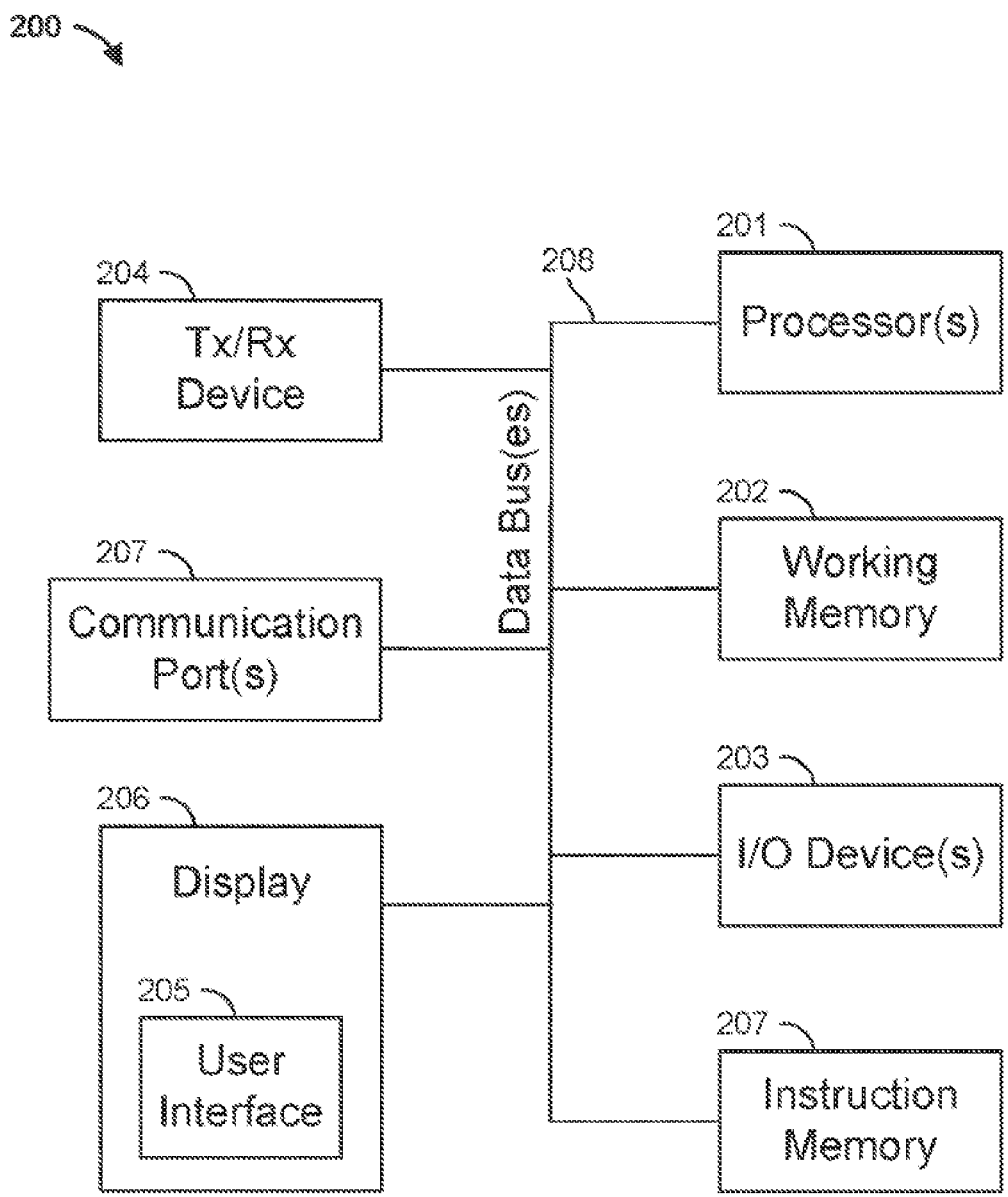
FIG. 2 is a block diagram of the fraud detection computing device of the fraud detection system of FIG. 1 in accordance with some embodiments.

FIG. 2 illustrates the fraud detection computing device 102 of FIG. 1. Fraud detection computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of fraud detection computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as payment transfer data.

Display 206 can display user interface 205. User interfaces 205 can enable user interaction with fraud detection computing device 102. For example, user interface 205 can be a user interface for an application of a retailer that allows a customer to purchase one or more items from the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 fraud detection computing device 102 will be operating in. Processor(s) 201 is operable to receive data from, or send data to, a network, such as communication network 118 of FIG. 1, via transceiver 204.

Figure 3:
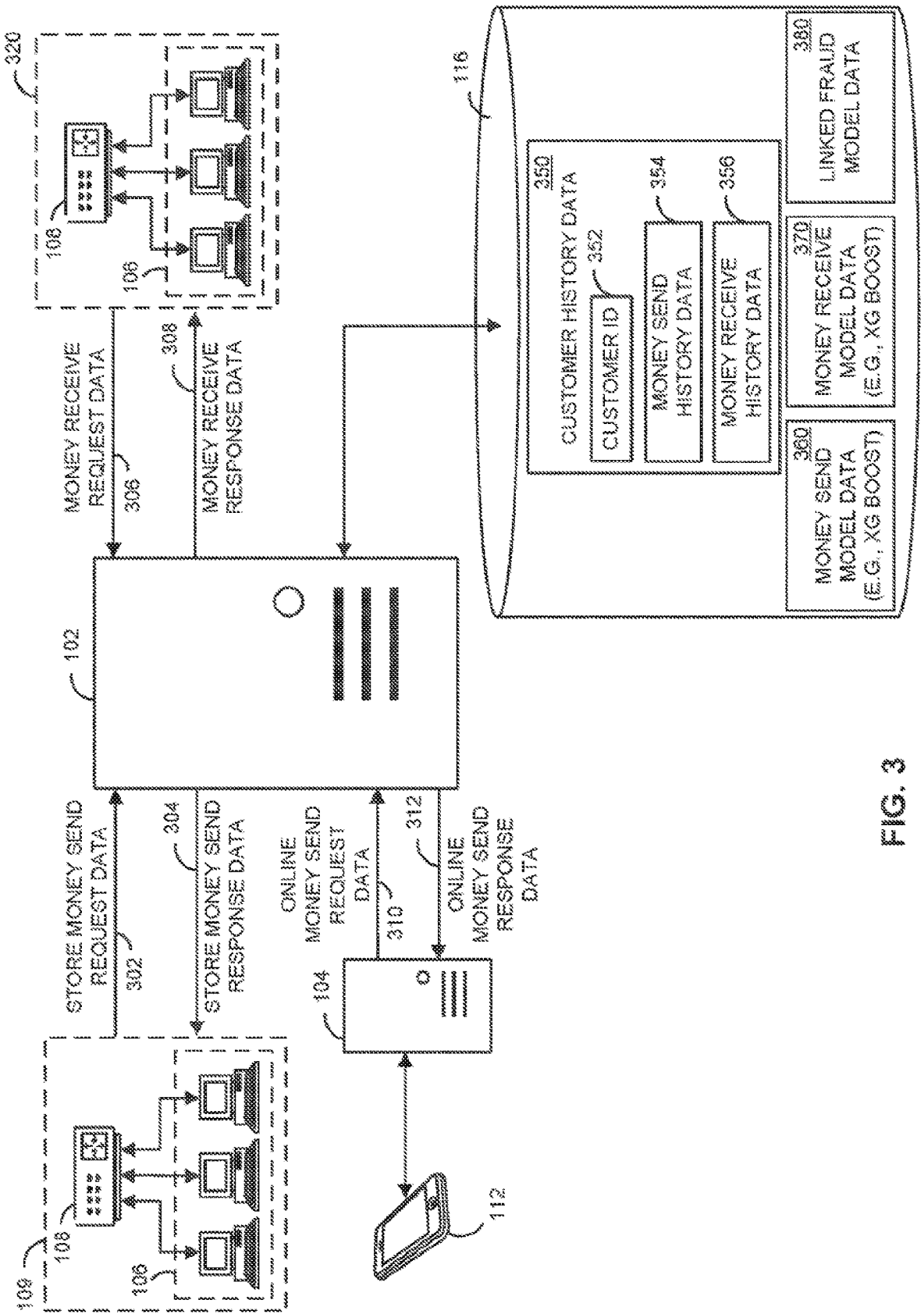
FIG. 3 is a block diagram illustrating examples of various portions of the fraud detection system of FIG. 1 in accordance with some embodiments.

FIG. 3 is a block diagram illustrating examples of various portions of the fraud detection system of FIG. 1. In this example, fraud detection computing device 102 can receive from a store 109 (e.g., from a computing device, such as workstation 106, at store location 109) store money send request data 302 identifying a request for a payment transfer. Similarly, fraud detection computing device 102 can receive from web server 104 online money send request data 310 identifying a request for a payment transfer (e.g., such as for a payment transfer initiated online, such as on a retailer's webpage hosted by web server 104).

Store money send request data 302 and online money send request data 310 may each include, for example, one or more of the following: a payment amount, an identification of the payer (e.g., customer ID, passport ID, driver's license number, etc.); an image of an identification of the payee; a method of payment being used for the payment transfer (e.g., credit card, cash, check); and/or any other data related to the attempted payment transfer.

Fraud detection computing device 102 may execute one or more fraud detection models based on store money send request data 302 and/or online money send request data 310 to generate one or more fraud detection scores. In some examples, fraud detection score 102 may determine customer history data 350 associated with store money send request data 302 and/or online money send request data 310. For example, store money send request data 302 and/or online money send request data 310 may identify a name or ID of the customer (in this example, the payer). Based on the name or ID of the customer, fraud detection computing device 102 may obtain customer history data 350 from database 116 for the customer. Customer history data 350 may include, for example, a customer ID 352 (e.g., a customer name, an ID number, online ID, etc.), money send history data 354 identifying historical payment transactions as a payee, and money request history data 356 identifying historical payment transactions as a payer, for the customer.

Based on store money send request data 302 and/or online money send request data 310 and associated customer history data 350, fraud detection computing device 102 may execute a fraud detection model (e.g., algorithm), such as one identified and characterized by money send model data 360 stored in database 116, to generate a fraud detection score. Based on the fraud detection score, fraud detection computing device 102 may determine whether the payment transfer identified by store money send request data 302 and/or online money send request data 310 is fraudulent. For example, fraud detection computing device 102 may compare the generated fraud detection score with a threshold to determine whether the payment transfer is fraudulent. In some examples, fraud detection computing device 102 determines that the payment transfer is not to be allowed unless additional information is verified (e.g., the payment transfer is "challenged"). The additional data may be additional data related to the payee, the payer, the method of payment transfer, verification of payment amount, or any other additional data.

For example, fraud detection computing device 102 may determine whether the generated fraud detection score is within a range (e.g., such as one configured by a user or determined during fraud detection model training). If the fraud detection score is within the range, the payment transfer is challenged. Otherwise, if the fraud detection score is above the range, the payment transfer is determined to be fraudulent. If the fraud detection score I below the range, the payment transfer is determined to not be fraudulent.

In some examples, fraud detection computing device 102 may also execute a linked fraud model, such as one identified by linked fraud model data 380, to determine if the payment transaction can be linked to fraud. The linked fraud model may identify one or more conditions to determine whether the transaction may be or is linked to fraud. For example, by executing the linked fraud model, fraud detection computing device 102 may determine that a payment transfer is fraudulent if one or more of the following conditions are satisfied: the payment will be received by a confirmed fraudster (e.g., the payee identified by store money send request data 302 and/or online money send request data 310); more than a threshold percentage (e.g., 10%) of payers that have transferred payments to the payee (e.g., over a period of time) have reported the payee as a fraudster; and more than a threshold percentage (e.g., 10%) of transactions picked up by the payee have been fraudulent. In some examples, all of these conditions must be met for the payment transaction to be determined as fraudulent. The linked fraud model may implement other conditions as well.

In some examples, fraud detection computing device 102 determines that the payment transfer identified by money send model data 360 is fraudulent based on the execution of at least one of the fraud detection model and the linked fraud model. In some examples, fraud detection computing device 102 determines that the payment transfer is fraudulent only when indicated by both models.

In response to store money send request data 302, fraud detection computing device 102 may transmit store money send response data 304 identifying whether the payment transfer is fraudulent. For example, store money send response data 304 may identify whether the payment transfer is fraudulent based on the decisions reached when executing one or more of the fraud detection model and the linked fraud model. If transmit store money send response data 304 identifies that the payment transfer is fraudulent, store 109 may not allow the payment transfer. If, however, store money send response data 304 identifies that the payment transfer is not fraudulent, store 109 may allow the payment transfer.

In some examples, store money send response data 304 identifies that the payment transfer is to be challenged. In these examples, store money send response data 304 may also identify the additional data to be verified. For example, workstation 106 at store 109 may receive store money send response data 304 identifying that the payment transfer is being challenged, and that the payer is to show an additional ID to verify their identity. If the customer presents the additional ID, store 109 may allow the payment transfer. Otherwise, if the customer does not present the additional ID, store 109 may not allow the payment transfer.

Similarly, in response to online money send request data 310, fraud detection computing device 102 may transmit online money send response data 312 identifying whether the payment transfer is fraudulent. For example, online money send response data 312 may identify whether the payment transfer is fraudulent based on the decisions reached when executing one or more of the fraud detection model and the linked fraud model. If online money send response data 312 identifies that the payment transfer is fraudulent, web server 104 may not allow the payment transfer. If, however, online money send response data 312 identifies that the payment transfer is not fraudulent, web server 104 may allow the payment transfer.

In some examples, online money send response data 312 identifies that the payment transfer is to be challenged. In these examples, online money send response data 312 may also identify the additional data to be verified. For example, web server 104 may receive online money send response data 312 identifying that the payment transfer is being challenged, and that the payer is to show an additional ID to verify their identity. If the customer presents the additional ID, web server 104 may allow the payment transfer. Otherwise, if the customer does not present the additional ID, web server 104 may not allow the payment transfer.

Assuming that fraud detection computing device 102 determines that the payment transfer (e.g., as identified by store money send request data 302 or online money send request data 310) is not fraudulent and the payment transfer is allowed, fraud detection computing device 102 may receive money receive request data 306 from store 320. Store 320 may be a location from which the payment transfer is to be received (e.g., as identified by store money send request data 302). When the payee arrives to receive (e.g., pickup) the payment, store 320 may transmit money receive request data 306 to fraud detection computing device 102. In response, fraud detection computing device 102 may apply one or more fraud detection models, such as one identified by money receive model data 370 stored in database 116, to determine whether the payment transfer is fraudulent (or, in some examples, whether it should be challenged).

In some examples, fraud detection computing device 102 may apply one or more linked fraud models, such as on identified by linked fraud model data 380, to also determine whether the payment transfer is fraudulent.

In response to store money send receive request data 306, fraud detection computing device 102 may transmit money receive response data 308 identifying whether the payment transfer is fraudulent. For example, money receive response data 308 may identify whether the payment transfer is fraudulent based on the decisions reached when executing one or more of the fraud detection model and the linked fraud model. If money receive response data 308 identifies that the payment transfer is fraudulent, store 320 may not allow the payment transfer. If, however, money receive response data 308 identifies that the payment transfer is not fraudulent, store 320 may allow the payment transfer. If money receive response data 308 identifies that the payment transfer is to be challenged, store 320 may allow the payment transfer upon the satisfaction of additional conditions, such as any identified by money receive response data 308.

Figure 4A:
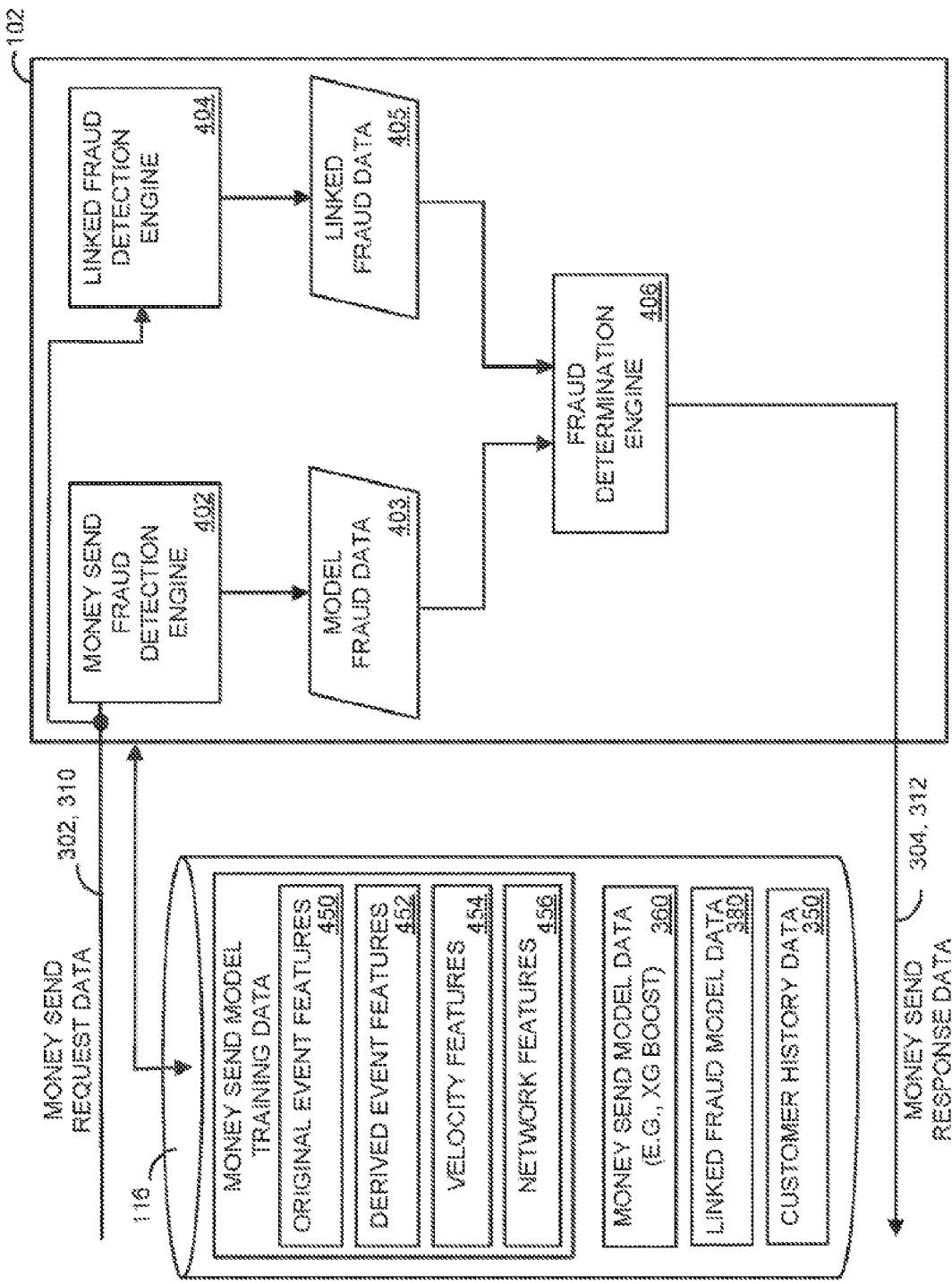
FIGS. 4A and 4B are block diagrams illustrating examples of various portions of the fraud detection computing device of FIG. 1 in accordance with some embodiments.
Figure 4B:
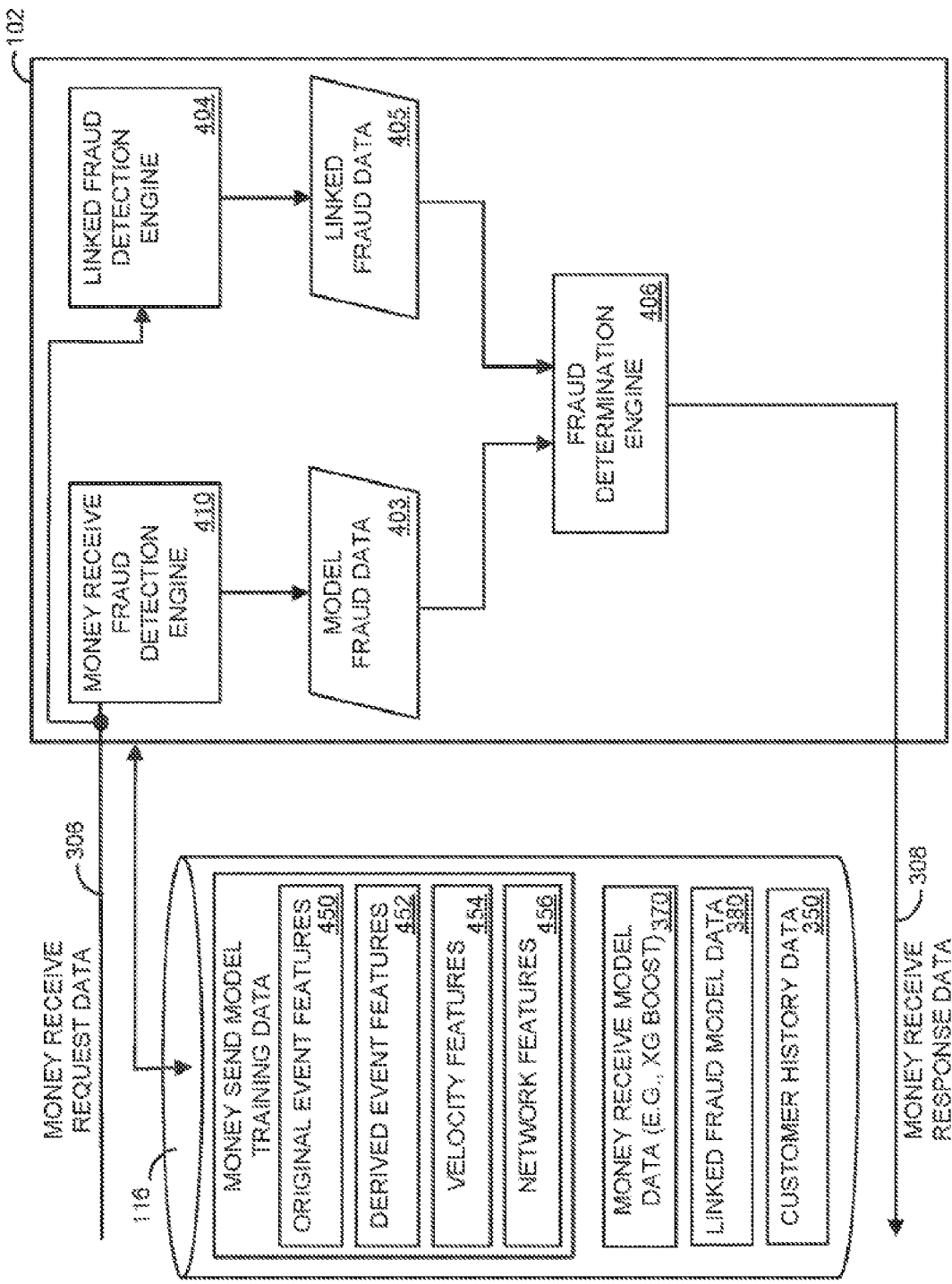

FIGS. 4A and 4B are block diagrams illustrating examples of various portions of the fraud detection system of FIG. 1. As illustrated in FIG. 4A, fraud detection computing device 102 includes money send fraud detection engine 402, linked fraud detection engine 404, and fraud determination engine 406. As illustrated in FIG. 4B, fraud detection computing device 102 also includes money receive fraud detection engine 410. In some examples, one or more of money send fraud detection engine 402, linked fraud detection engine 404, money receive fraud detection engine 410, and fraud determination engine 406 may be implemented in hardware. In some examples, one or more of money send fraud detection engine 402, linked fraud detection engine 404, money receive fraud detection engine 410, and fraud determination engine 406 may be implemented as an executable program maintained in a tangible, non-transitory memory, such as instruction memory 207 of FIG. 2, that may be executed by one or processors, such as processor 201 of FIG. 2.

Referring to FIG. 4A, money send fraud detection engine 402 may receive money send request data 302, 310 and execute one or more fraud detection models (e.g., algorithms), such a money send fraud detection model identified and characterized by money send model data 360, to generate fraud detection scores. The money send fraud detection models may have been trained with, for example, original event features 450, derived event features 452, velocity features 454, and/or network features 456 stored in database 116.

In some examples, money send fraud detection engine 402 may determine customer history data 350 associated with money send request data 302. The fraud detection model may operate on money send request data 302, 310 and associated customer history data 350, where execution of the models generates model fraud data 403 identifying fraud detection scores.

Linked fraud detection engine 404 may execute one or more linked fraud models (e.g., algorithms), such as a model identified and characterized by linked fraud model data 380. The linked fraud models operate on money send request data 302, 310, where execution of the model generates linked fraud data 405 identifying whether the payment transfer identified by money send request data 302, 310 is fraudulent. For example, linked fraud data 405 may be a binary value where one value indicates payment transfer fraud, and another value indicates no payment transfer fraud.

Fraud determination engine 406 receives model fraud data 403 and linked fraud data 405, and determines whether the payment transfer identified and characterized by linked money send request data 302, 310 is fraudulent. For example, fraud determination engine 406 may compare a fraud detection score identified by model fraud data 403 with a fraud detection range. If the fraud detection score is above the fraud detection range, fraud determination engine 406 may determine that the payment transfer is fraudulent. If the fraud detection score is below the fraud detection range, fraud determination engine 406 may determine that the payment transfer is not fraudulent. Otherwise, if the fraud detection score falls within the range (e.g., inclusively), fraud determination engine 406 may determine that the payment transfer is to be challenged.

In some examples, fraud determination engine 406 determines that the payment is fraudulent if indicated by linked fraud data 405 regardless of model fraud data 403. In some examples, fraud determination engine 406 determines that the payment is fraudulent if either the fraud detection score identified by model fraud data 403 is above the range, or if a fraudulent payment transfer is indicated by model fraud data 403. Fraud detection determination engine 406 generates money send response data 304, 312, identifying and characterizing the fraud detection decision.

Referring to FIG. 4B, money receive fraud detection engine 410 may receive money receive request data 306 and execute one or more fraud detection models (e.g., algorithms), such a money receive fraud detection model identified and characterized by money receive model data 370, to generate fraud detection scores. The money receive fraud detection models may have been trained with, for example, original event features 450, derived event features 452, velocity features 454, and/or network features 456 stored in database 116.

In some examples, money receive fraud detection engine 410 may determine customer history data 350 associated with money receive request data 306. The fraud detection model may operate on money receive request data 306 and associated customer history data 350, where execution of the models generates model fraud data 403 identifying fraud detection scores.

Linked fraud detection engine 404 may execute one or more linked fraud models (e.g., algorithms), such as a model identified and characterized by linked fraud model data 380. The linked fraud models operate on money receive request data 306, where execution of the model generates linked fraud data 405 identifying whether the payment transfer identified by money receive request data 306 is fraudulent. For example, linked fraud data 405 may be a binary value where one value indicates payment transfer fraud, and another value indicates no payment transfer fraud.

Fraud determination engine 406 receives model fraud data 403 and linked fraud data 405, and determines whether the payment transfer identified and characterized by money receive request data 306 is fraudulent. For example, fraud determination engine 406 may compare a fraud detection score identified by model fraud data 403 with a fraud detection range. If the fraud detection score is above the fraud detection range, fraud determination engine 406 may determine that the payment transfer is fraudulent. If the fraud detection score is below the fraud detection range, fraud determination engine 406 may determine that the payment transfer is not fraudulent. Otherwise, if the fraud detection score falls within the range (e.g., inclusively), fraud determination engine 406 may determine that the payment transfer is to be challenged.

In some examples, fraud determination engine 406 determines that the payment is fraudulent if indicated by linked fraud data 405 regardless of model fraud data 403. In some examples, fraud determination engine 406 determines that the payment is fraudulent if either the fraud detection score identified by model fraud data 403 is above the range, or if a fraudulent payment transfer is indicated by model fraud data 403. Fraud detection determination engine 406 generates money receive response data 308 identifying and characterizing the fraud detection decision.

Figure 5A:
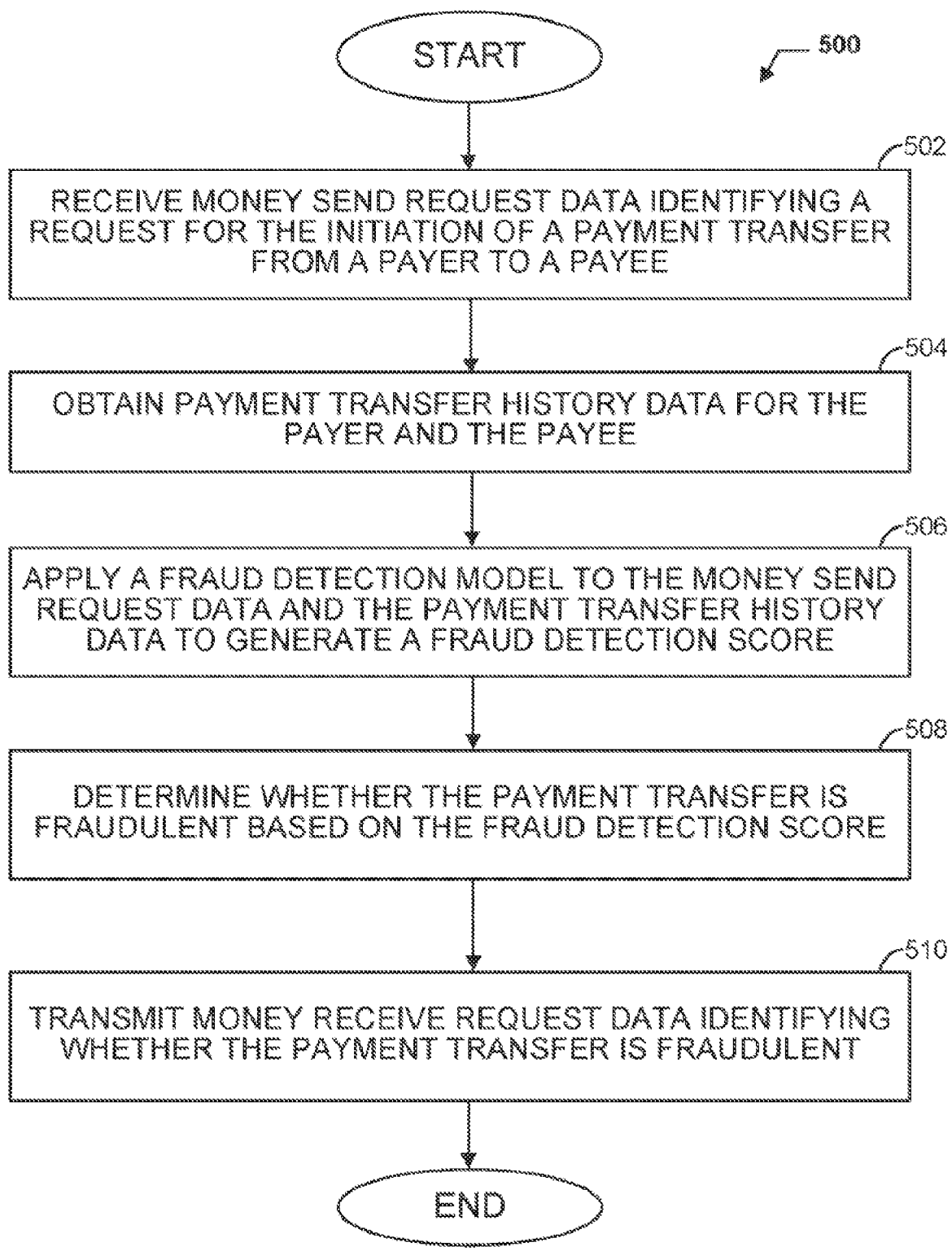
FIGS. 5A and 5B are flowcharts of an example method that can be carried out by the fraud detection system 100 of FIG. 1 in accordance with some embodiments.

FIG. 5A is a flowchart of an example method 500 that can be carried out by the fraud detection system 100 of FIG. 1. Beginning at step 502, money send request data is received identifying a request for the initiation of a payment transfer. For example, fraud detection computing device 102 may receive store money send request data 302 or online money send request data 310. The money send data identifies a request for the initiation of a payment transfer from a payer to a payee. At step 504, payment transfer history data from the payer, and for the payee, is obtained. For example, fraud detection computing device 102 may determine customer history data 350 associated with the payment transfer. At step 506, a fraud detection model is applied to the money send request data and associated payment transfer history data to generate a fraud detection score. For example, fraud detection computing device 102 may execute an algorithm identified by money send model data 360 to generate a fraud detection score.

Proceeding to step 508, a determination is made as to whether the payment transfer is fraudulent based on the generated fraud detection score. For example, fraud detection computing device 102 may determine that the payment transfer is fraudulent and is not to be allowed, not fraudulent and may be allowed, or is to be challenged and allowed only if additional requirements are satisfied (e.g., such as the presenting by the payer, or payee, of an additional ID). At step 510, money receive request data is transmitted. For example, fraud detection computing device 102 may transmit money send response data 304, 312 identifying whether the payment transfer is fraudulent. The method then ends.

Figure 5B:
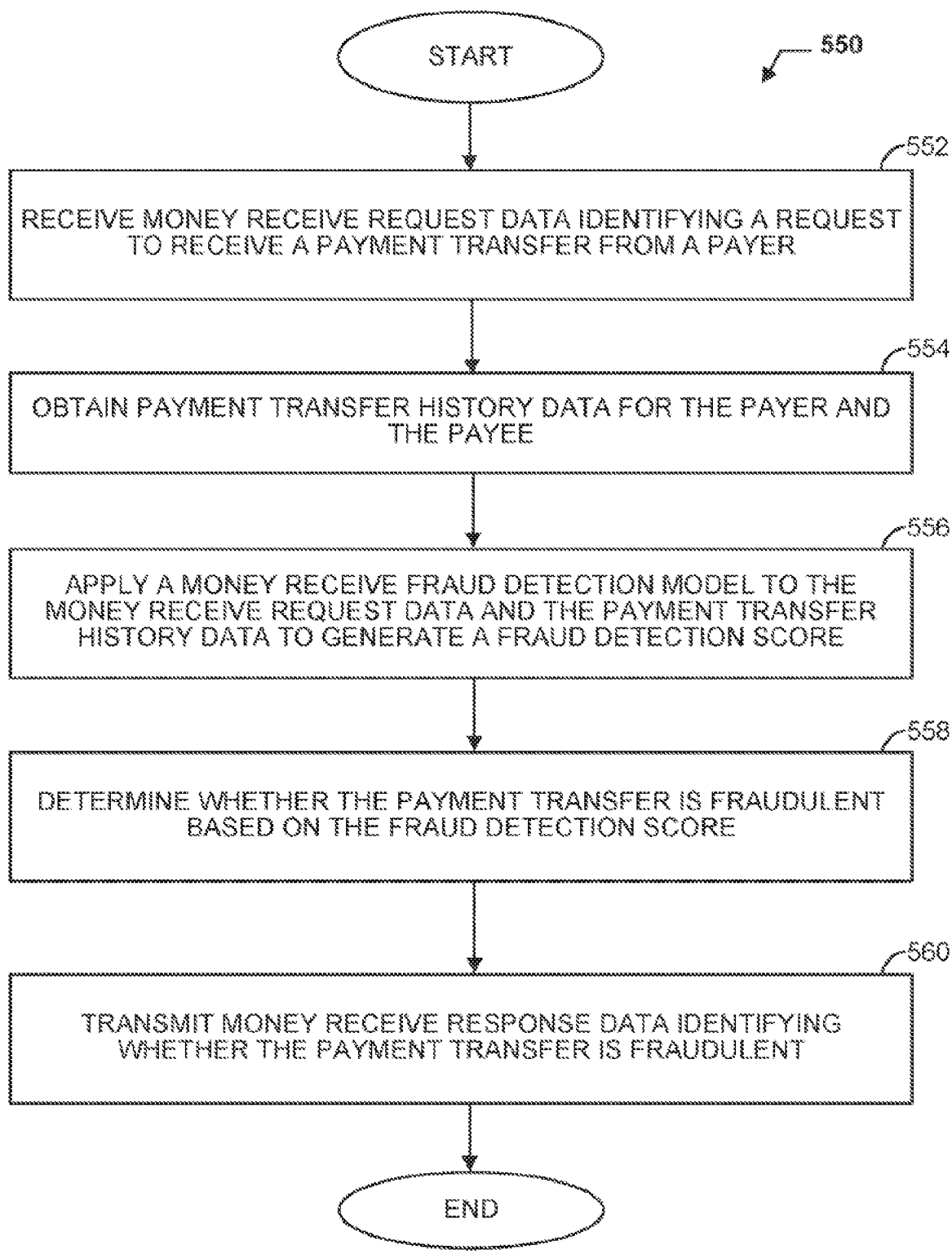

FIG. 5B is a flowchart of an example method 550 that can be carried out by the fraud detection system 100 of FIG. 1. Beginning at step 552, money send request data is received identifying a request for receiving (e.g., picking up) a payment transfer. For example, fraud detection computing device 102 may receive store money receive request data 306. The money receive data identifies a request for the pickup of a payment transfer from a payee. At step 554, payment transfer history data from the payer, and for the payee, is obtained. For example, fraud detection computing device 102 may determine customer history data 350 associated with the payment transfer. At step 556, a fraud detection model is applied to the money receive request data and associated payment transfer history data to generate a fraud detection score. For example, fraud detection computing device 102 may execute an algorithm identified by money receive model data 370 to generate a fraud detection score.

Proceeding to step 558, a determination is made as to whether the payment transfer is fraudulent based on the generated fraud detection score. For example, fraud detection computing device 102 may determine that the payment transfer is fraudulent and is not to be allowed, not fraudulent and may be allowed, or is to be challenged and allowed only if additional requirements are satisfied (e.g., such as the presenting by the payer, or payee, of an additional ID). At step 560, money receive response data is transmitted. For example, fraud detection computing device 102 may transmit money receive response data 308 identifying whether the payment transfer is fraudulent. The method then ends.

Figure 6:
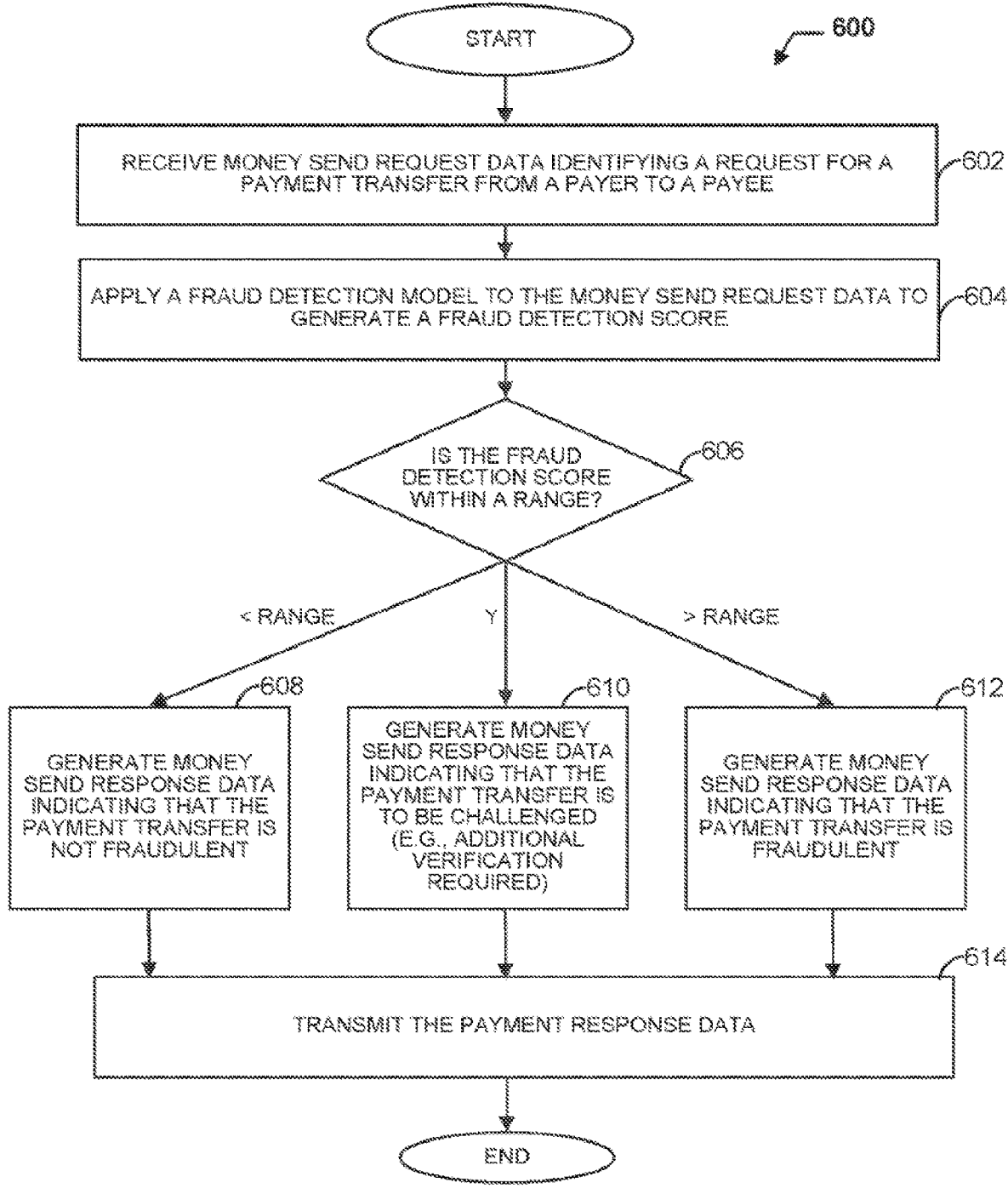
FIG. 6 is a flowchart of another example method that can be carried out by the fraud detection system 100 of FIG. 1 in accordance with some embodiments.

FIG. 6 is a flowchart of an example method 600 that can be carried out by the fraud detection system 100 of FIG. 1. Beginning at step 602, money send request data is received. The money send data identifies a request for a payment transfer from a payer to a payee. At step 604, a fraud detection model is applied to the money send request data to generate a fraud detection score.

Proceeding to step 606, a determination is made as to whether the fraud detection score is within a range. If the fraud detection score is below the range, the method proceeds to step 608, where money send response data is generated indicating that the payment transfer is not fraudulent. If the fraud detection score is above the range, the method proceeds to step 612, where money send response data is generated indicating that the payment transfer is fraudulent. If the fraud detection score is within the range, the method proceeds to step 610, where money send response data is generated indicating that the payment transfer is to be challenged (e.g., additional verification required). From steps 608, 610, and 612, the method proceeds to step 614, where the generated money response data is transmitted. For example, fraud detection computing device 102 may transmit the generated money response data to web server 104 or store 109.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
    a database;
    a non-transitory memory;
    a transceiver configured to receive a request for a payment transfer, wherein the request is stored in the non-transitory memory;
    a processor configured communicatively coupled to the database and the non-transitory memory, wherein the processor is configured to:
        obtain from the database, based on the received request obtained from the non-transitory memory, first data associated with previous payment transfers; and
        extract, from the request for the payment transfer and the first data, a first set of input features;
    a fraud detection engine comprising at least one trained detection model configured to receive the first set of input features and generate second data including a fraud detection value based on the first set of input features;
    a fraud determination engine configured to:
        receive the second data;
        determine whether the payment transfer is fraudulent based on a comparison of the second data to a fraud detection range;
        based on the determination, generate response data identifying whether the payment is fraudulent;
        store the response data in the database; and
        transmit, via the transceiver, in response to the request, the generated response data identifying whether the payment transfer is fraudulent.

2. The system of claim 1, wherein the at least one trained detection model includes at least one of a gradient boosting model, a logistics regression model or a combination thereof.

3. The system of claim 1, wherein the processor is configured to:
    extract, from the request for the payment transfer and the first data, a second set of features including at least one of an original event feature, a derived event feature, a velocity feature, and a network feature, and wherein the fraud detection engine comprises:
        a send fraud detection engine including a first trained detection model configured to detect fraud during payment initiation, wherein the first trained detection model is configured to receive the first set of features; and
        a receive fraud detection engine including a second trained detection model configured to detect fraud during payment reception, wherein the second trained detection model is configured to receive the second set of features.

4. The system of claim 1, wherein the first set of input features comprise original event features, derived event features, velocity features, and network features.

5. The system of claim 1, wherein the processor is further configured to determine that at least one additional condition is to be satisfied for the payment transfer to be allowed.

6. The system of claim 1, wherein the processor is configured to:
    obtain aggregated historical payment transfer data from a database; and
    generate the first set of features based on the aggregated historical payment transfer data.

7. The system of claim 1, wherein the fraud determination engine is configured to:
    compare the fraud detection value to a threshold; and
    determine that the payment transfer is fraudulent based on the comparison.

8. The system of claim 1, wherein the fraud detection engine includes a linked fraud model configured to generate third data representative of a fraudulent link determination based on a second set of input features, and wherein the fraud determination engine is configured to determine whether the payment transfer is fraudulent based on the second data and the third data.

9. The system of claim 8, wherein the linked fraud model is further configured to:
    determine whether the received request satisfies at least one condition for the payment transfer to be fraudulent; and
    determine that the payment transfer is fraudulent based on determining that the at least one condition is satisfied.

10. The system of claim 1, wherein the transceiver is further configured to receive a second request for receiving the payment transfer, and wherein the fraud detection engine generates third data identifying a second fraud detection value based on the received second request, and wherein the fraud determination engine determines whether the payment transfer is fraudulent based on the third data and based on the determination, transmits a second response identifying whether the payment transfer is fraudulent.

11. The system of claim 10, wherein the processor is configured to obtain, from the database, based on the second request, fourth data associated with previous payment transfers, and wherein the third data identifying the second fraud detection value is generated based on the fourth data.

12. The system of claim 1, wherein the request for the payment transfer is received from a remote computing device, and the response identifying whether the payment transfer is fraudulent is transmitted to the remote computing device.

13. A computer-implemented method, comprising:
- receiving, via a transceiver, a request for a payment transfer;
- obtaining, based on the request, first data associated with previous payment transfers; and
- extracting, from the request and the first data, a first set of input features;
- applying, by a fraud detection engine, at least one trained detection model configured to receive the first set of input features and generate second data including a fraud detection value based on the first set of input features;
- receiving, by a fraud determination engine, the second data;
- determining, by the fraud determination engine, whether the payment transfer is fraudulent based on a comparison of the second data to a fraud detection range;
- based on the determination, generating response data identifying whether the payment is fraudulent;
- storing the response data in a database; and
- transmitting, via the transceiver, in response to the request, the generated response data identifying whether the payment transfer is fraudulent.

14. The computer-implemented method of claim 13, wherein the at least one trained detection model includes at least one of a gradient boosting model, a logistics regression model or a combination thereof.

15. The computer-implemented method of claim 13, comprising:
- extracting, from the request and the first data, a second set of features including at least one of an original event feature, a derived event feature, a velocity feature, and a network feature;
- applying, by a send fraud detection engine, a first trained detection model configured to detect fraud during payment initiation, wherein the first trained detection model is configured to receive the first set of features; and
- applying, by a receive fraud detection engine, a second trained detection model configured to detect fraud during payment reception, wherein the second trained detection model is configured to receive the second set of features.

16. The computer-implemented method of claim 13, wherein the first set of input features comprise original event features, derived event features, velocity features, and network features.

17. The computer-implemented method of claim 13, comprising determining that at least one additional condition is to be satisfied for the payment transfer to be allowed.

18. The computer-implemented method of claim 13, comprising
- obtaining aggregated historical payment transfer data from a database; and
- generating the first set of features based on the aggregated historical payment transfer data.

19. The computer-implemented method of claim 13, comprising:
- comparing the fraud detection value to a threshold; and
- determining that the payment transfer is fraudulent based on the comparison.

20. A non-transitory computer readable medium having instructions stored thereon, wherein the instructions, when executed by at least one processor, cause a device to perform operations comprising:
- receiving, via a transceiver, a request for a payment transfer;
- obtaining, based on the request, first data associated with previous payment transfers; and
- extracting, from the request and the first data, a first set of input features;
- applying, by a fraud detection engine, at least one trained detection model configured to receive the first set of input features and generate second data including a fraud detection value based on the first set of input features;
- receiving, by a fraud determination engine, the second data;
- determining, by the fraud determination engine, whether the payment transfer is fraudulent based on a comparison of the second data to a fraud detection range;
- based on the determination, generating response data identifying whether the payment is fraudulent;
- storing the response data in a database; and
- transmitting, via the transceiver, in response to the request, the generated response data identifying whether the payment transfer is fraudulent.

* * * * *